United States Patent
Arensdorf et al.

(10) Patent No.: US 8,596,613 B2
(45) Date of Patent: Dec. 3, 2013

(54) SWING SUPPORT MOBILIZATION LIFT

(75) Inventors: Brad Arensdorf, Jacksonville, FL (US);
Troy Thompson, Perry, FL (US);
William Thompson, Perry, FL (US)

(73) Assignee: Mobex of North Florida, Inc.,
Jacksonville, FL (US)

( * ) Notice: Subject to any disclaimer, the term of this patent is extended or adjusted under 35 U.S.C. 154(b) by 485 days.

(21) Appl. No.: 12/794,414

(22) Filed: Jun. 4, 2010

(65) Prior Publication Data

US 2011/0297905 A1 Dec. 8, 2011

(51) Int. Cl.
*B66F 5/02* (2006.01)
*B66F 3/24* (2006.01)
*B66F 3/42* (2006.01)
*B66F 3/36* (2006.01)

(52) U.S. Cl.
USPC ........ 254/100; 254/2 B; 254/10 B; 254/10 R; 254/93 H; 254/134

(58) Field of Classification Search
USPC ............ 254/2 B, 10 R, 10 B, 93 H, 134, 100; 414/490, 331.06, 800, 47.131
See application file for complete search history.

(56) References Cited

U.S. PATENT DOCUMENTS

| | | | |
|---|---|---|---|
| 4,934,893 A | 6/1990 | Johnson | |
| 5,562,392 A * | 10/1996 | Raben | 414/608 |
| 5,716,186 A | 2/1998 | Jensen et al. | |
| 5,782,600 A | 7/1998 | Walsh | |
| 6,095,537 A | 8/2000 | Cozza et al. | |
| 7,311,487 B1 | 12/2007 | Crossley et al. | |
| 2004/0021280 A1 | 2/2004 | Peggs | |
| 2004/0219003 A1* | 11/2004 | Bik et al. | 414/462 |
| 2005/0225047 A1 | 10/2005 | Schilling et al. | |
| 2007/0059138 A1 | 3/2007 | Cozza | |
| 2007/0194546 A1* | 8/2007 | Cozza | 280/47.131 |
| 2008/0066925 A1* | 3/2008 | Mosing et al. | 166/380 |
| 2008/0286080 A1* | 11/2008 | Walsh | 414/373 |
| 2009/0183954 A1* | 7/2009 | Cozza et al. | 187/237 |
| 2009/0185885 A1* | 7/2009 | Cozza et al. | 414/331.06 |
| 2010/0108445 A1* | 5/2010 | Kritzer | 187/218 |

OTHER PUBLICATIONS

Photographs taken on Nov. 7, 2007 of inventor working with existing equipment, 14 pages, 14 photographs.

* cited by examiner

*Primary Examiner* — Lee D Wilson
*Assistant Examiner* — Seahee Yoon
(74) *Attorney, Agent, or Firm* — Christopher Paradies; Paradies Law P.A.

(57) ABSTRACT

A swing support mobilization lift includes a jack and a pivotably positionable swing arms, pivotally coupled to the jack, such that the attachment mechanism is capable of being initially displaced in the plane of the jack mechanism during insertion of the lifting device in a narrowly accessible space adjacent to shelving. Then, the swing arms are capable of being pivoted to extend outwardly from the plane of the surface of a jack facing the shelving, such that the shelving may be attached to the swing arms, such as by pins tethered to the jack. In one example, a pair of swing arms disposed on opposite sides of a portion of the shelving sandwich the portion of the shelving and support opposite ends of the pins coupling the swing arms to the shelving.

9 Claims, 22 Drawing Sheets

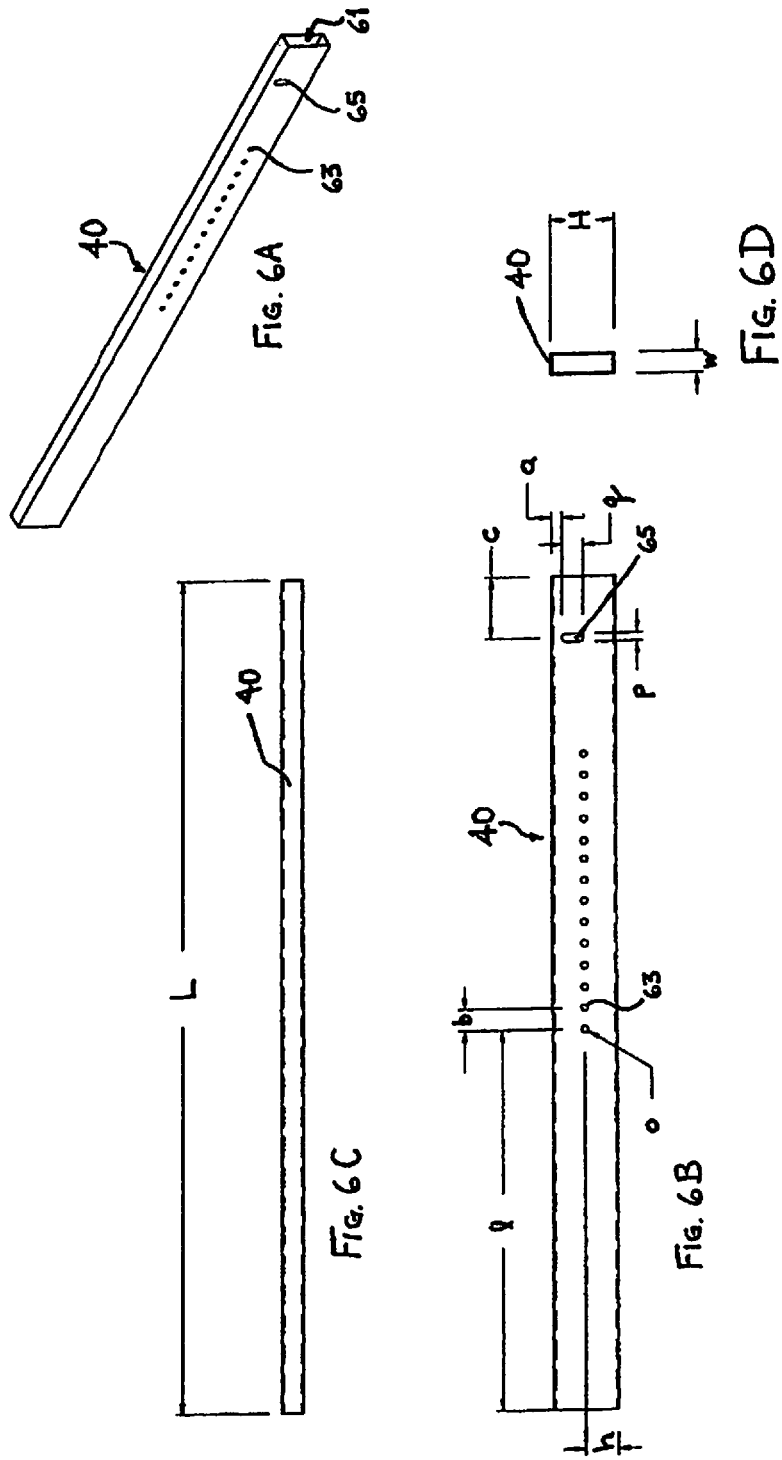

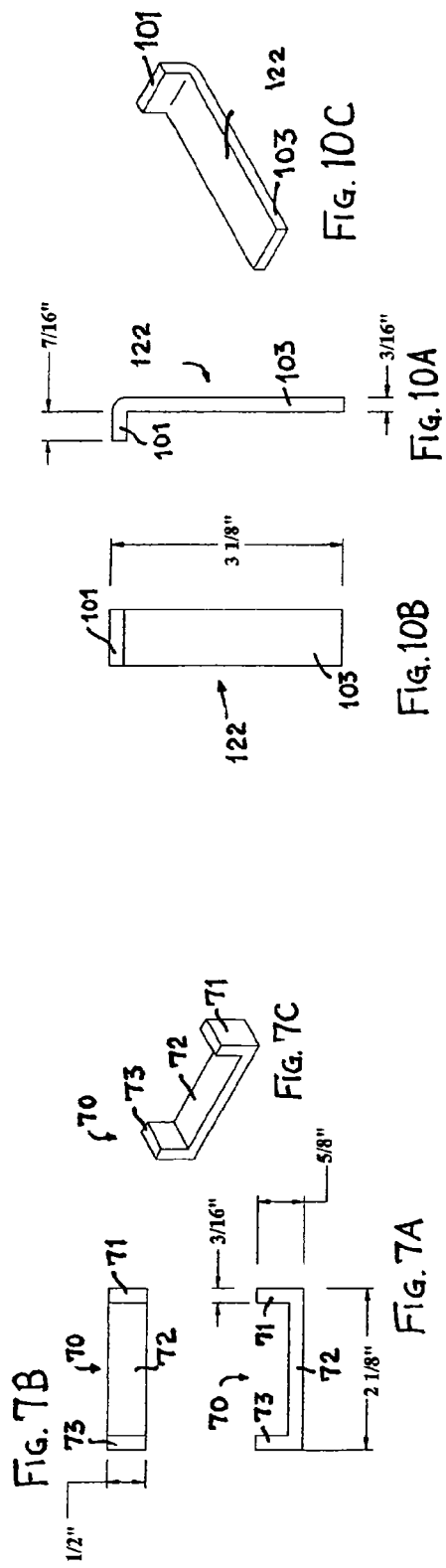

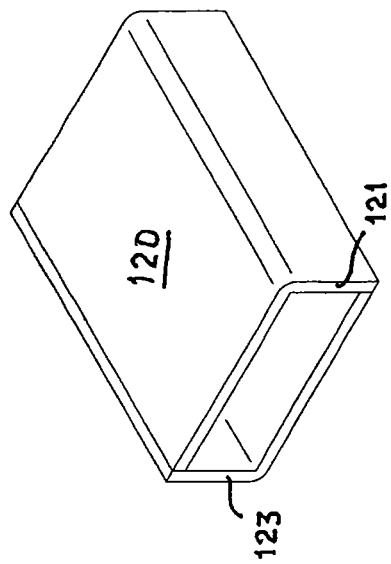
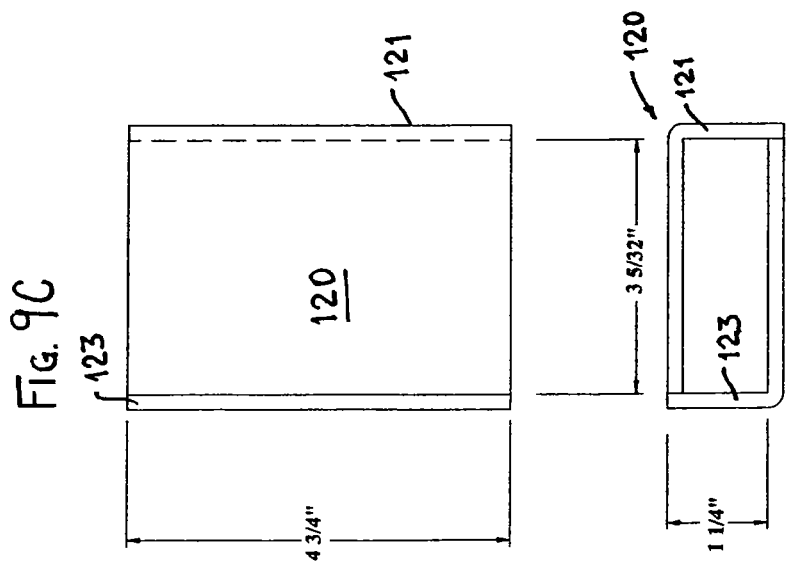

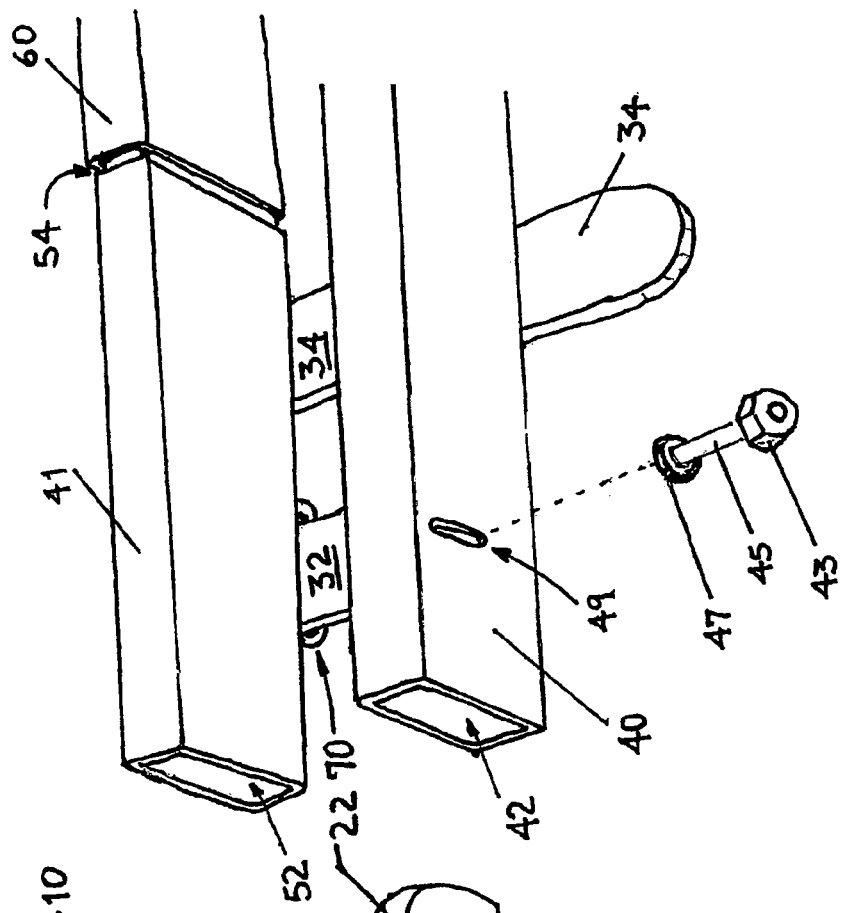
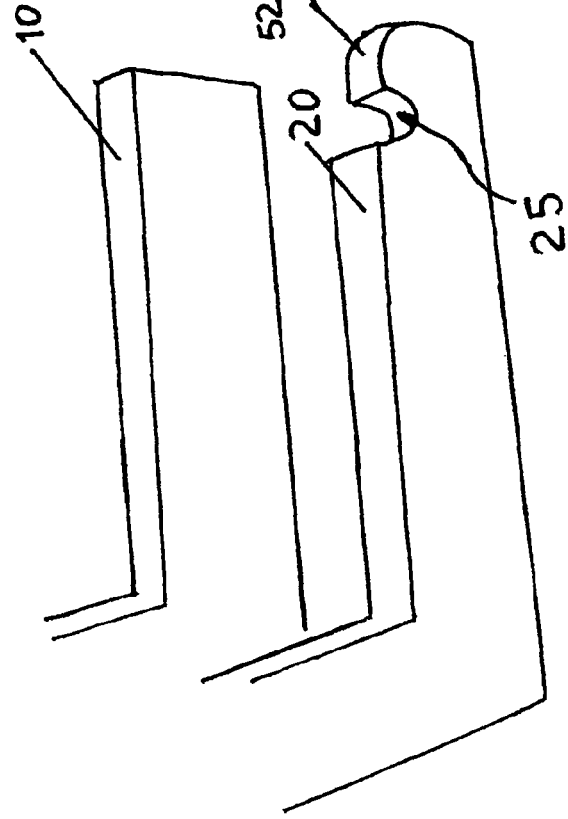

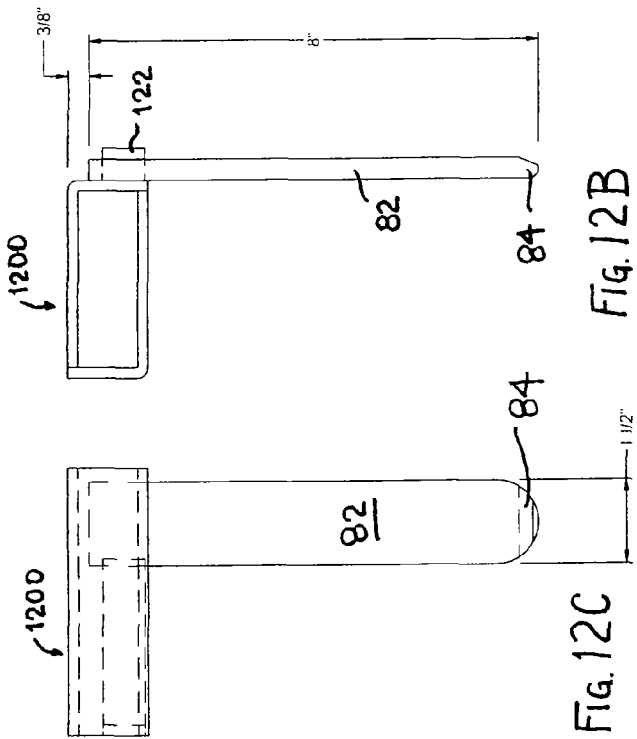
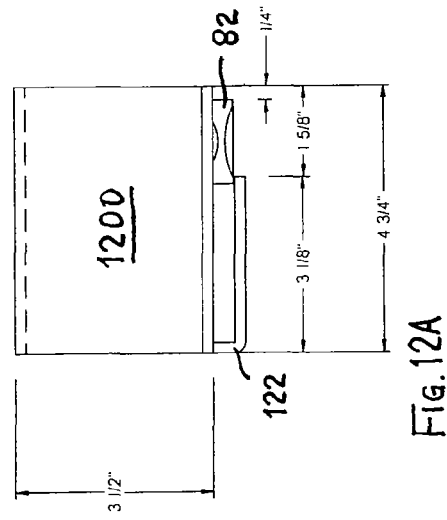
Fig. 12B
Fig. 12C
Fig. 12A

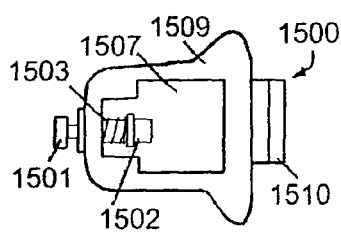
FIG. 15D
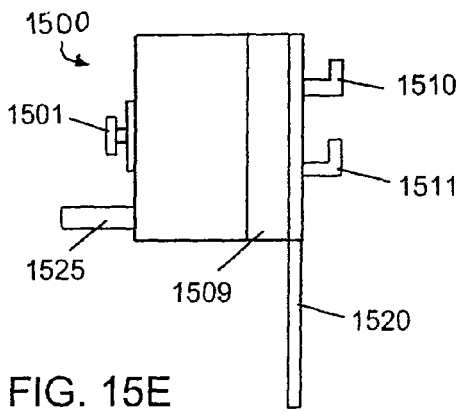
FIG. 15E
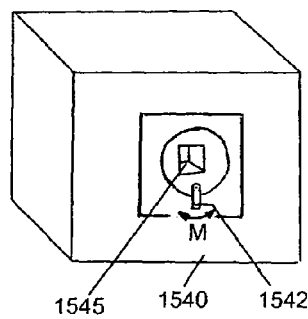
FIG. 15B
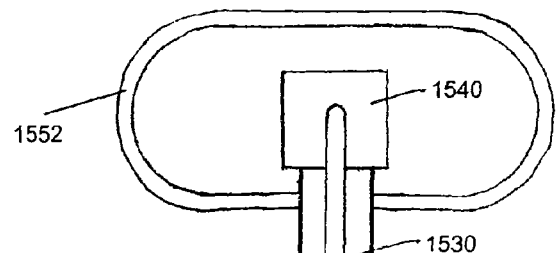
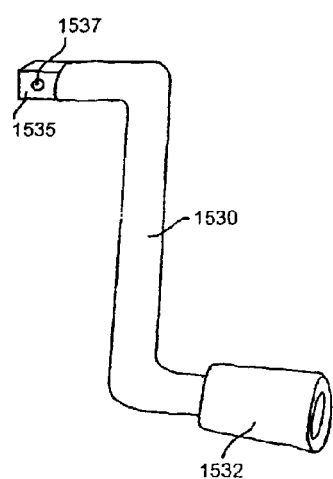
FIG. 15C
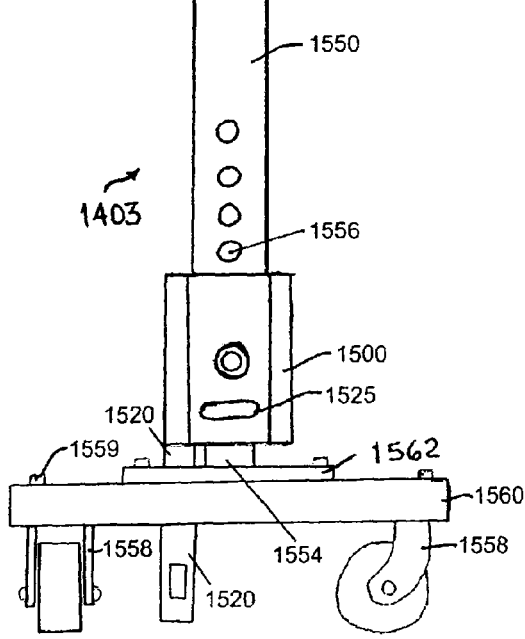
FIG. 15A

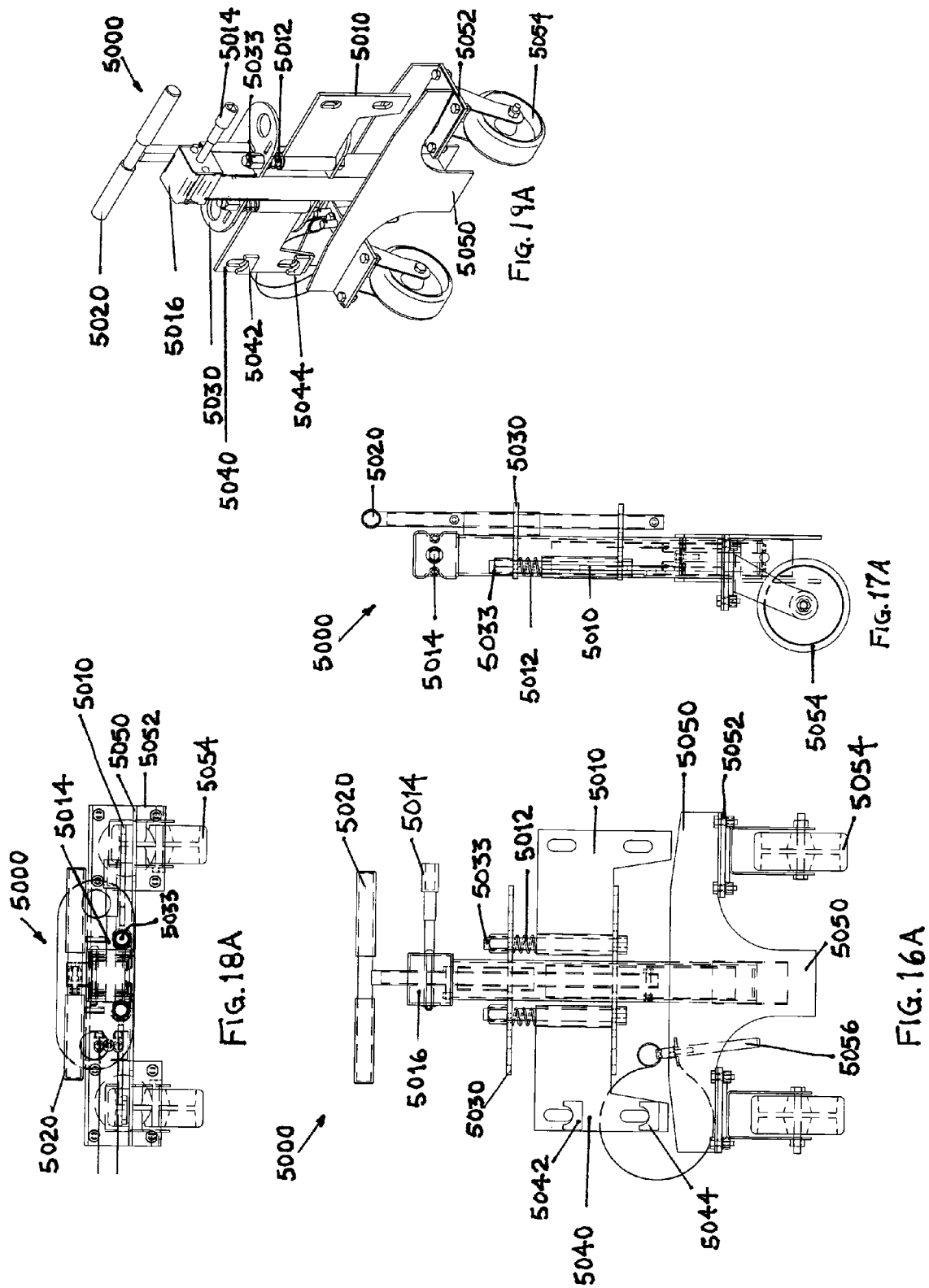

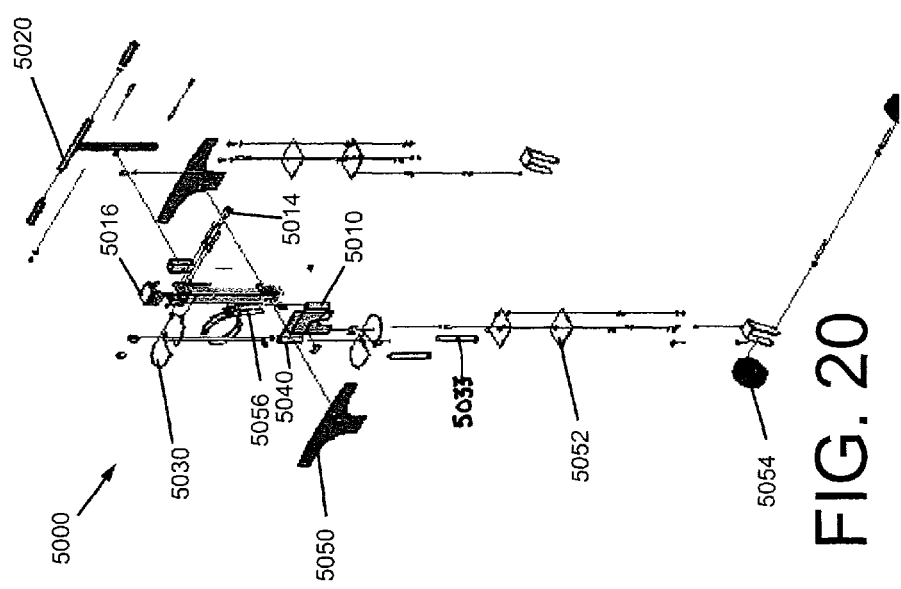

SWING SUPPORT MOBILIZATION LIFT

FIELD OF THE INVENTION

The field relates to mobilization equipment for shelving.

BACKGROUND

Within the context of this specification, gondola, gondola run, gondolas and gondola islands all refer to store shelving known in the field. Gondolas, such as the one depicted in FIGS. 13A-13C, are known with or without a central support column and with one or two sides having shelving attached. Warehouse pallet racking is also known, such as pallet racking used in home centers and warehouses. Unless otherwise expressly indicated, the term gondolas refer to both a single gondola or a gondola run having a plurality of gondolas or both.

Lifting systems are known that use a plurality of caster wheels to mobilize empty gondolas or gondolas that have at least a portion of the racked products removed from the gondolas. U.S. Patent Publication 2007/0194546, published Aug. 23, 2007, and U.S. Patent Publication 2007/0059138, published Mar. 15, 2007 illustrate systems with a screw or hydraulic jack for lifting gondolas, the description and drawings of which are hereby incorporated for background herein. Two devices are disposed on opposite sides of the gondolas at each upright support, which may be accessible behind a kick plate. Each upright support is raised using the lifting apparatus and the gondola, even if quite long, is movable using the lifting system as a hand truck, with each of the hand trucks being moved at the same time.

However, deep gondolas and gondolas with products racked on the gondolas cannot be moved using these known devices. An upright support in the middle of a gondola, between two opposite sides of the gondola, bows excessively, causing damage to the gondola support structure and tumbling of the products. Thus, a time consuming unracking and reracking of at least a significant portion of the products on the gondolas is required in order to mobilize the gondolas.

U.S. patent application Ser. No. 12/364,177, the disclosure of which is incorporated herein, teaches a system for mobilization of stocked gondolas that allows for mobilization without removing shelving and without removing the products from the shelving of the gondolas or pallet racking. The system described a lifting mechanism attachable an H-support or other upright support of pallet racking, such as for use in mobilization of the pallet racking, but only from an exposed front or side of the H-support. Using the system for mobilizing a gondola permits even very deep and very wide gondolas to be mobilized, without unracking and/or disassembly of the gondolas and/or removal of product from the shelves, when a pair of opposing members are positioned such that the members extend along the depth of the gondola from one side to an opposite side. Each pair of opposing members is positioned such that the pair of members is disposed on opposite sides of a gondola support. A slidable middle lift bracket on each of the pair of opposing members is positioned at the middle, upright support of the gondola, and may have additional lift brackets disposed at other upright support members of the gondola. An interlinking tongue and loop system may be used to slide under the supports and to engage one lift bracket to its opposite lift bracket. Thus, the pair of opposing members may provide rigid support to the gondola, when the pair of opposing members are lifted, allowing for mobilization of the gondola. In this system, a modified jack engaged each end of each of the opposing members, such as a screw or hydraulic mechanism coupled with a pair of forks capable of engaging the pair of opposing members, such that the forks raise and lower the pair of opposing members together, at the same time. The forks are fixed in position and are not capable of displacement to make positioning of the jack in narrow inaccessible spaces.

In one example, a hand crank, such as a hand crank and screw similar to that of a boat trailer hitch apparatus, is used to lift a pair of forks inserted into the opposing members. A screw and handcrank is capable of replacing a heavier, more expensive and harder to maintain hydraulic jack, for example, when a plurality of such lift mechanisms are coupled to opposite ends of a plurality of the support apparatuses spaced at intervals along a gondola run. No single lift mechanism is required to exceed its rated lifting potential. The lack of any significant sagging from one side of the gondola reduces the height that the lift must raise the gondola to mobilize it, because the support bar is capable of supporting the supporting structure of the gondola a plurality of support points, such as three or more support points. In some of the examples, three support points are disclosed, but additional support points may be added in other applications requiring support of larger spans, for example.

Single sided gondolas and islands may be raised and lowered similarly to the double-sided gondolas provided in the examples. In single sided gondolas, a support bar may be supported on only one side by a lift mechanism or on both sides. If supported on only one side by a lift mechanism, then other end of the support bar may be unsupported, requiring a counterbalance on the lift mechanism, or may be provided with a low-profile caster wheel that provides a fulcrum at an opposite end of the support bar assembly for lifting of the gondola during raising of the end of the support bar assembly attached to the lift mechanism, for example. In this way, a gondola having one side against a wall may be mobilized, for example, using a plurality of lift mechanisms along the side of the gondola facing away from the wall, only, while the low-profile casters inserted into or onto the support bar assemblies allow the support bar assemblies to be inserted and aligned under the gondolas.

Instead of forks, other structures are suggested to mount the lifting apparatus to the support structures used in lifting of the gondolas or to the gondolas, themselves. These other structures may be grabs, bolts or fingers, for example. Grabs are L-shaped extensions from a surface of the lift mechanism that are capable of engaging slots in a coupling mechanism or a gondola. For example, forks may be attached to an attachment member having slots that engage the grabs, allowing the forks to be positioned in the ends of the gondola support bars prior to engaging the lift apparatus to the forks. Then, the lift apparatus may be positioned such that the grabs engage the slots in the attachment member of the forks, and the lift apparatus may be raised until the grabs firmly engage in the slots prior to raising the gondolas. Bolts are fasteners extending from the lift mechanisms that are coupled with nuts or plates having a threaded or other coupling mechanism for attachment to the bolts when inserted through a hole or slot in the gondolas or the attachment member of the forks, for example. Fingers are projections, shaped or straight that matingly engage the gondola or the attachment member of the forks, for example. Thus, when properly engaged to the supports or the gondolas, the lift mechanism provides for a positive displacement upward and downward. However, these other structures did not suggest the use of any structures capable of moving, pivotally, while remaining engaged to the lift mechanism.

Shelving used in warehouses, superstores, consumer retail clubs and home improvement stores cannot be moved using a lifting bar mechanism. Furthermore, these types of shelves are usually positioned back-to-back to form aisles with little space between the shelves, making it difficult to insert any known lifting mechanism between the shelves. Instead, only the sides of the shelving are accessible for coupling to the jacks described in a Mobilization System for Lifting and Mobilization of Gondolas.

SUMMARY

A lifting device includes a jack and a pivotably positionable attachment mechanism, pivotally coupled to the jack, such that the attachment mechanism is capable of being initially displaced in the plane of the jack mechanism during insertion of the lifting device in a narrowly accessible space adjacent to shelving. Then, the attachment mechanism is capable of being pivoted to extend outwardly from the plane of the surface of a jack facing the shelving, such that the shelving may be attached to the attachment mechanism extending on one or both sides of a shelving support.

For example, the shelving support may be an upright element of H-shelving that has holes provided in the upright element, and the attachment mechanism may comprise one or more holes extending through a plate pivotably coupled to the jack by a hinge. When pivoted into position for attaching to the shelving, a pair of plates may sandwich the upright element. By adjusting the height of the plates, such as by raising or lowering the jack with a ratchet mechanism, one or more pins may be inserted through the holes in the holes in the plates and the holes in the upright element of the shelving, securing the lifting mechanism to the upright element. By raising the raising the lifting mechanism using the jack, the lifting element, in conjunction with a set of lifting mechanisms likewise attached to other upright elements of the shelving, supports the weight of the shelving, with or without unstocking the shelving.

The pivotably displaceable attachment mechanism makes insertion of the lifting device possible in a narrow space provided between back-to-back rows of stocked shelving, which would otherwise be immovable using known jacks and mobilization gear.

In addition, the pins used with the attachment mechanism to secure the upright element of shelving to the attachment mechanism may, themselves, be secured to the jacks by a tether, at all times. In combination with the pivotably coupled plates of the attachment mechanism, for example, the tethered pins insure that everything necessary to align and attach a lifting device to shelving is present at all times.

BRIEF DESCRIPTION OF THE DRAWINGS

FIG. 1B illustrates a top plan view of the example in FIG. 1A.

FIG. 6A illustrates a perspective view of an extendable tube for use in fabricating an extendable member of the system of FIG. 1A and FIG. 1B.

FIG. 6B illustrates a side view of the extendable tube of FIG. 6A.

FIG. 6C illustrates a top view of the extendable tube of FIG. 6A.

FIG. 6D illustrates an end view of the extendable tube of FIG. 6A.

FIGS. 7A-7C illustrate views of a receiving member.

FIG. 7B illustrates a side plan view of the receiving member of FIG. 5A.

FIGS. 8A-8C illustrate views a tongue.

FIG. 9A-9C illustrate views of a tube fabricated from two L-shaped members.

FIGS. 10A-10C illustrate views a retaining member.

FIGS. 11A and 11B illustrate a mating portion of a lifting apparatus for use with examples of a mobilization system for use with gondolas.

FIGS. 12A-12C illustrate views of a slide bracket.

FIG. 12B illustrates an end plan view of the assembly of FIG. 12A.

FIGS. 15A-15E illustrate sketches of an example of a lifting mechanism.

FIGS. 16A-19B illustrate views of examples of a lifting device insertable in a gap between two back-to-back rows of warehouse shelving, for example.

FIG. 20 illustrates an exploded view of one example of a lifting device.

DETAILED DESCRIPTION

Figure 14:
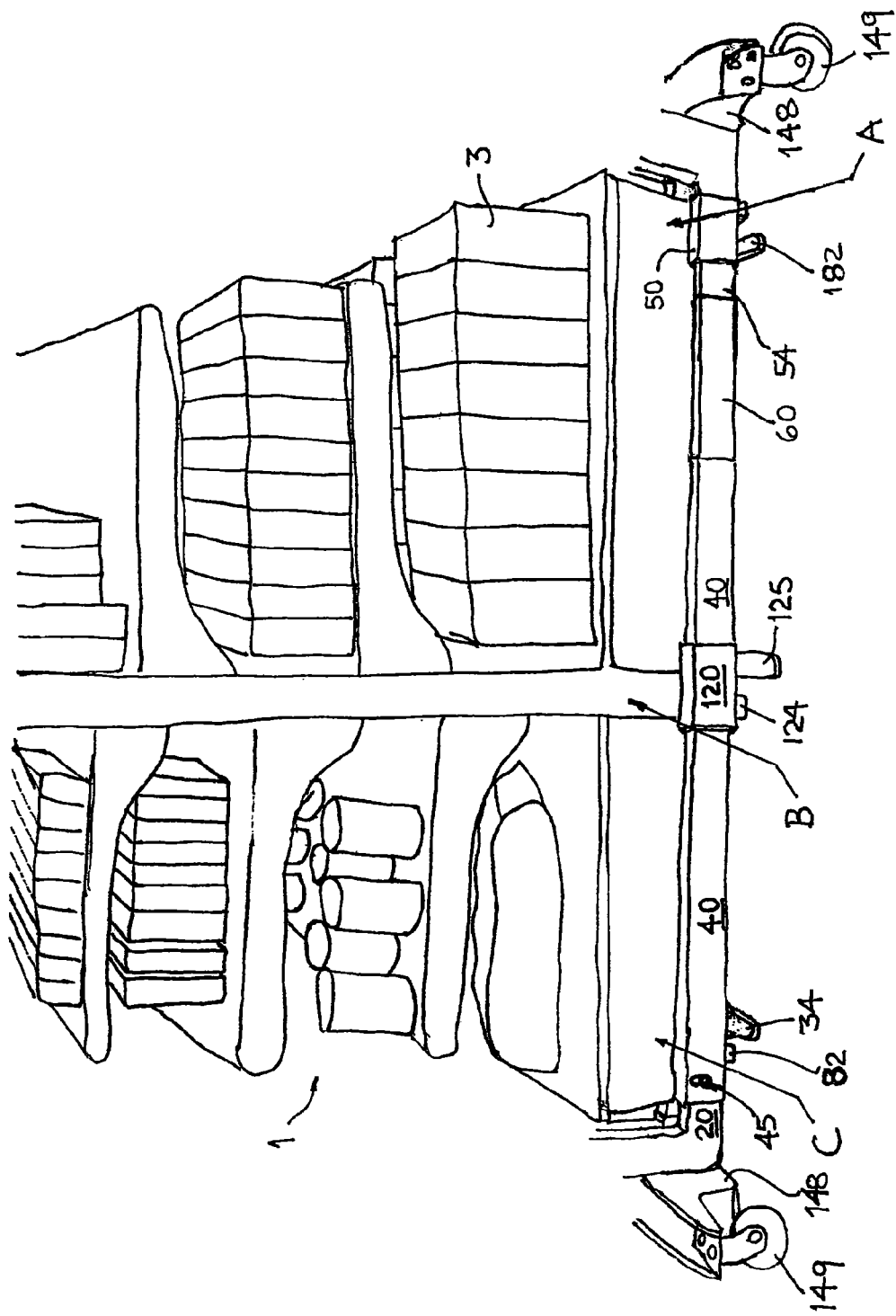
FIG. 14 illustrates a sketch of an example of a portion of a lifting apparatus for mobilization of stocked gondolas assembled and installed on one end of a gondola having products displayed on the shelving of the gondola.

Many variations and combinations of the component parts illustrated in the drawings and disclosed in the examples are included within the scope of the invention. FIGS. 1A-1C and 5A illustrate an example of a support bar assembly 1000 of a mobilization system for stocked gondolas 1. A system comprises two opposing, complementary assemblies 1000 that have brackets 50, 120 and one or more extendable members 60, 160—with tongues 32, 124, 82 that fit into receiving members 70, 122 of one assembly 1000 opposite from the other assembly 1000. The tongues 32, 124, 82 and receiving members 70, 122 interlock and support a plurality of support points of a gondola, such as the middle support B and outer supports A, C of gondola 1, as illustrated in the example of FIG. 14. The gondola 1 may be stocked with items 3 on the shelves during mobilization of the gondola 1.

Figure 1C:
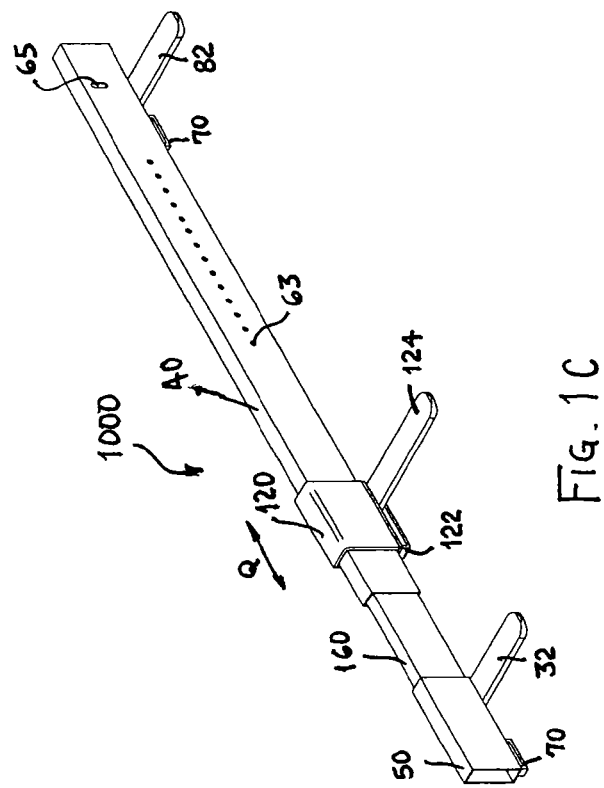
FIGS. 1A-1C illustrate views of one example of a support bar assembly of a mobilization system for lifting and mobilization of gondolas.
Figure 1A:
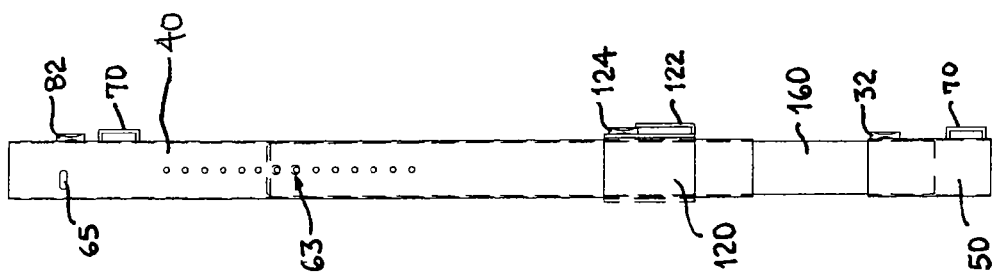
Figure 1B:
Figure 2A:
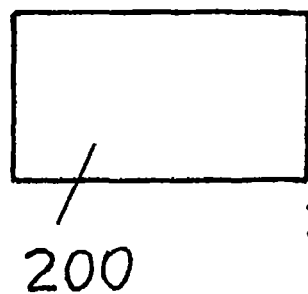
FIGS. 2A and 2B illustrate views of a tube having a channel.
Figure 5A:
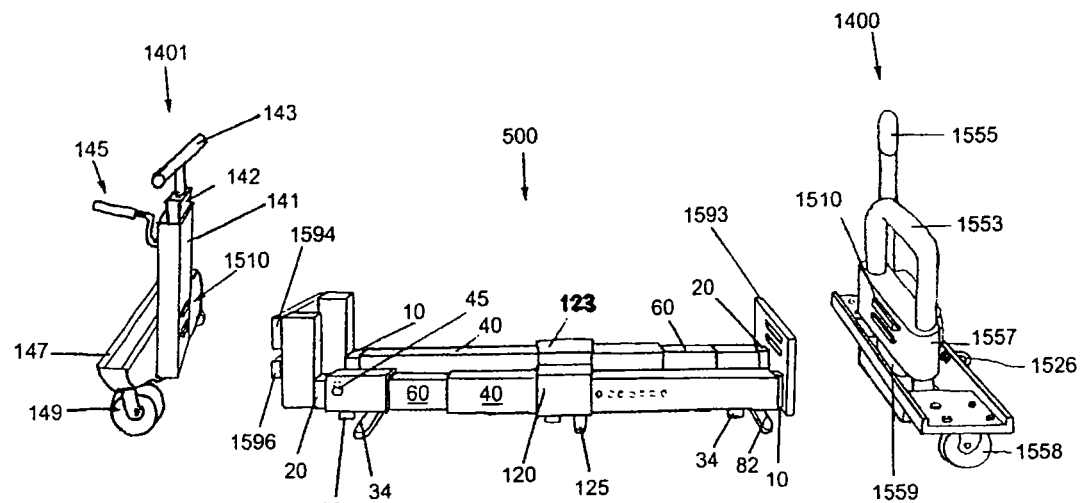
FIG. 5A sketches an example of a system for mobilization of stocked gondolas mounted on two different types of manual lift trucks.

Components may be fabricated, such as by welding and assembly, to provide a pair of complementary, opposing support bar assemblies 1000, such as illustrated schematically in the sketch of FIG. 5A. FIG. 2A shows a side plan view of a tube used in fabricating components of the examples. The tube 200 may be made of a rigid material having a sufficient stiffness and other mechanical properties to safely raise and move gondolas together with items stocked on the gondolas. The dimensions of the tube 200 are selected to provide sufficient stiffness and to mate with other components of the assemblies 1000. For example, components may be coupled telescopically, as illustrated in FIG. 1A-1C. The height H of a support component, such as the extendable member 60, must be able to fit under the bottom shelf of a gondola, if a solid kick plate is removed or if an open-faced kick plate is present or otherwise. The length of a support component L, such as an extendable member 60, may be selected to allow the assembly 1000 to extend from one side of a gondola to the other, when coupled telescopically with other components of the assembly 1000. A plurality of opposing assemblies 1000 may be coupled at a plurality of supports along the length of a gondola or gondola run, such as a gondola run running the length of an aisle in a store. By installing a plurality of the assemblies 1000 along the length of the gondolas, the entire aisle of gondolas may be lifted and mobilized, together with stockage, for example.

On one end of an assembly 1000, an end bracket 50 may be attached to an extendable member 160, which may be telescopically mated with another extendable member 60, for example. An end bracket 50 may be coupled to an extendable member 60, 160 by any means, such as by welding, fastening, bonding or the like. In one example, an extendable member 60 has an integrated end bracket with a slot 65 for holding a pin, as illustrated in detail in FIGS. 6B and 11B, and a retaining member 70 and tongue 82 welded to a bottom portion of the extendable member 60. The slot may have a length q greater than its width p, and may be distance from the top of the member 60 and at a distance c from the end of the member 60. The distances a, c may be selected to align the slot 65 with a recess 25 in one of the forks 20, as illustrated in FIG. 11A, for example.

In one example of an extendable member 60, fourteen through holes 63 or recesses may be provided at a height h and starting at a distance 1 from one end of the extendable member 60 as illustrated in more detail in FIG. 6A-6C. The holes may be disposed at a distance b one from the other, for example, such that telescopically inserted second extendable member 160 may be coupled with a retainer in one or more of the holes 63 of the first extendable member 60 having the holes 63, as illustrated in FIGS. 1A and 1B, which show the second extendable member 160 extending into the first extendable member 60, by making the first extendable member 60 transparent or using hidden lines. The holes 63 may be provided for convenience and flexibility in adjusting the length of a support bar 1000 during installing and disassembly of the system, for example.

Figure 2B:
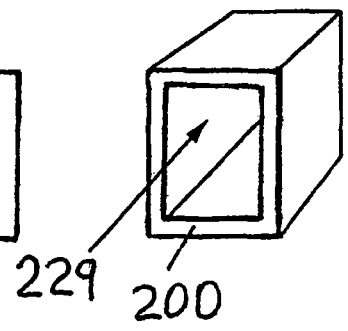

FIG. 2B shows a perspective view of a tube 200 having a channel 229 extending along the length of a tube 200. The example of a tube 200, as illustrated in FIGS. 2A and 2B may be used to fabricate components of the support bar assembly 1000, for example. The channel 229 may have another tube inserted along the channel, providing for a telescopic fit of one tube inside of the other or a sliding fit of a bracket made from the tube on another tube. Thus, the tube 200 may cooperatively engage another tube or a solid member for extending along the axis of the tube 200. In this way, the system may be adjusted in length to accommodate a variety of gondolas with varying lengths, depths, widths and configurations. For example, a middle slide bracket 120 may be fabricated from such a tube 200 and may be slidably disposed on the extendable member 60, as illustrated in FIG. 1C. The slide bracket 120 is moveable in either direction Q along the extendable member 60, allowing the slide bracket 120 to be aligned with a central support B of a gondola 1, for example, as illustrated in FIG. 14. A middle slide bracket 120, as illustrated in the example of FIGS. 9A-9C, may be fabricated by tube forming or by welding or otherwise binding together of two L-shaped members 121, 123 to form the tube 200. FIGS. 12A-12C illustrate a detail view of such a slide bracket 1200 having a tongue 82 and a retainer 122 welded to the bottom of one of the L-shaped members 121, 123 that form the tube 200, for example. Dimensions shown are provided as an example, only.

A tongue 82 may have a tapered end 84, such as illustrated in FIGS. 8A-8C, for example. In one example, the tongue 82 has material removed, such as by machining or grinding, to form the tapered end 84. In another example, the tapered end 84 of the tongue 82 is forged into shape. The tapered end 84 is insertable to provide support under a gondola 1 support A, B, C and extends through a retaining member 122 of an opposite positioned assembly 1000, for example.

Figure 3A:
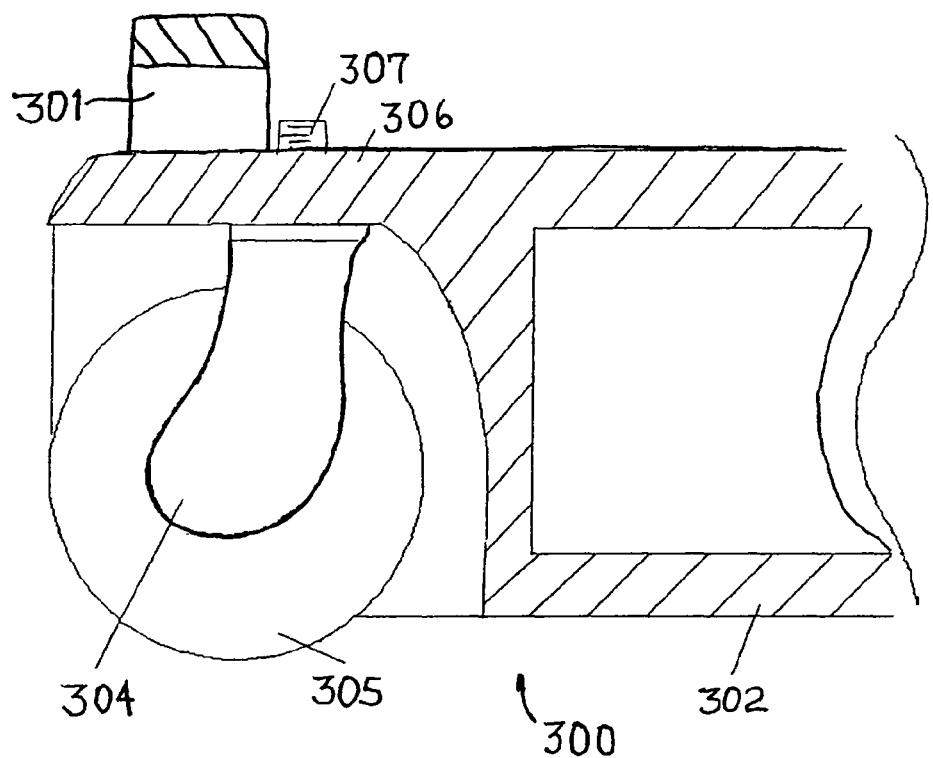
FIGS. 3A-3B illustrate (A) a partial cross sectional view of an example of a caster wheel insert 300 for single-sided gondola mobilization, and (B) an end portion 302 for coupling with an end of a support bar assembly.
Figure 3B:
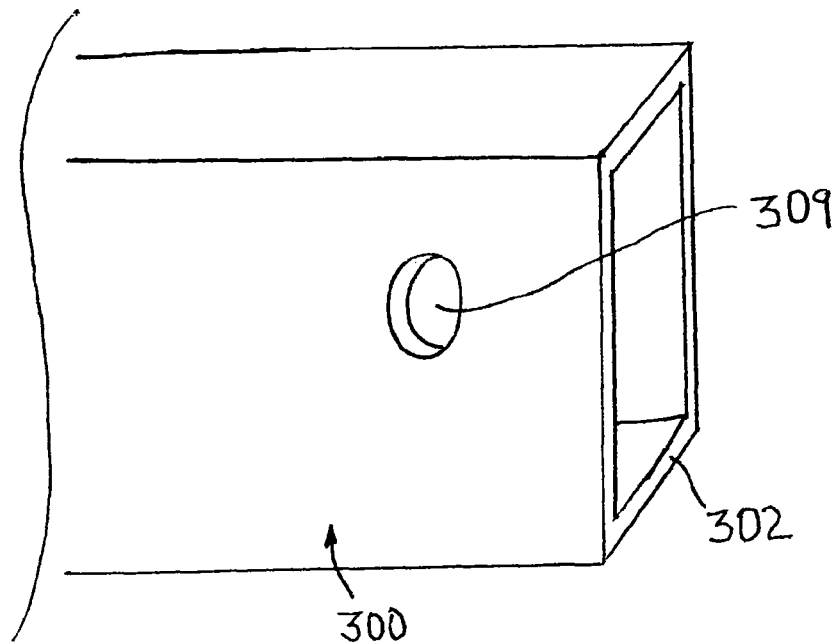

FIGS. 3A-3B illustrate (A) a partial cross sectional view of an example of a caster wheel assembly 300 for single-sided gondola mobilization, and (B) an end portion 302 for insertably coupling with an end of a support bar assembly. Other end portions may be used to couple with the support bar assembly. A caster wheel 304 multi-directionally couples a wheel 305 to a coupling member 306, such as by a threaded lug 307. The wheel 305 pivots freely about a rotational axis that may be aligned with the axis of the lug 307, for example. A cavity is formed by the coupling member 306 that permits free pivoting of the wheel 305 within the cavity during mobilization of the gondolas. The wheel 305 extends below the end portion 302 used for coupling with the support bar assembly. By extending slightly below the support bar assembly, the wheel 305 may acts as a fulcrum point for raising a gondola, when support bar assemblies having the caster wheel assembly 300 coupled at one end are raised at an opposite end by a lift mechanism. In one example, the end portion 302 is coupled to the support bar assembly by inserting the end portion 302 into the support bar assembly in the same manner as one of the forks of a lift mechanism would be inserted into the support bar assembly. A slot or hole 309 may be provided for insertion of a pin to retain the end portion 302 within the support bar assembly, for example.

One-sided gondolas and islands may be raised and lowered similarly to the double-sided gondolas provided in the example of FIG. 14. In single sided gondolas, a support bar may be supported on only one side by a lift mechanism or on both sides. If supported on only one side by a lift mechanism, then other end of the support bar may be unsupported, requiring a counterbalance on the lift mechanism, or may be provided with a low-profile caster wheel assembly 300, such as illustrated in FIGS. 3A and 3B, for example. In this way, a gondola having one side against a wall may be mobilized, for example, using a plurality of lift mechanisms along the side of the gondola facing away from the wall, without the use of any other special equipment than the caster wheel assemblies 300. Thus, a system for mobilization of double-sided gondolas 1 may be used for single-sided gondolas positioned against a wall, without much modification to the method or equipment. A push/pull rod or other device may be coupled to a mounting bracket 301, which may be coupled to the caster wheel assembly 300, for example, to assist in the pushing or pulling of gondolas 1. In another example, a pair of caster wheel assemblies 300 may be used for one or more of the pair of opposing support bar assemblies 1000 in mobilization of double sided gondolas 1 or gondola islands.

Figures 4A, 4B:
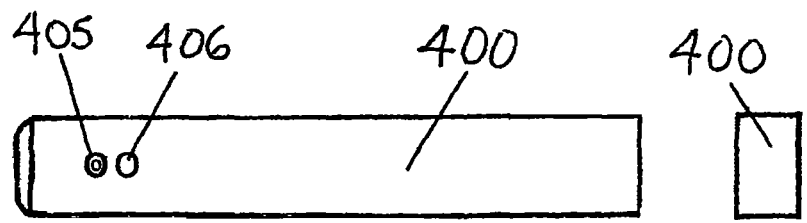
FIG. 4A illustrates a side view of an extendable member for insertion telescopically into a receiving extendable member of the example illustrated in FIGS. 1A-1C.
FIG. 4B illustrates an end plan view of the extendable member of FIG. 4A.

FIGS. 4A and 4B show an extendable member 400 for insertion into a receiving extendable member 60. A detent ball 405 provides for retaining of the member in the receiving member, for example. Alternatively or additionally, a pin may be inserted through a hole 406 in the member.

Figure 5B:
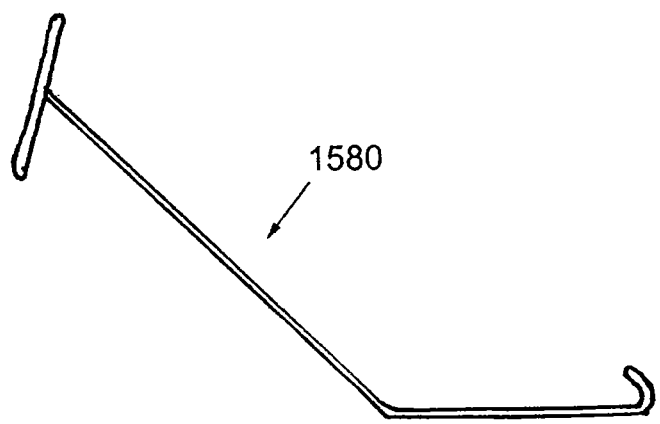
FIG. 5B sketches a push pull rod.
Figure 13A:
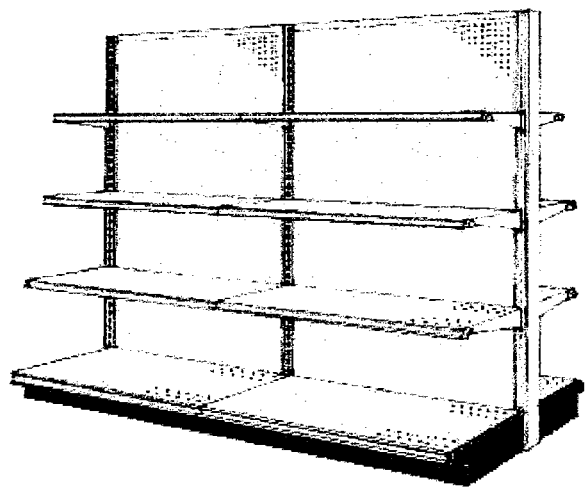
FIGS. 13A-13C illustrate a known gondola with (A) an assembled gondola run, (B) an exploded view of a gondola section, and (C) an end cap for terminating one end of the gondola run.
Figure 13B:
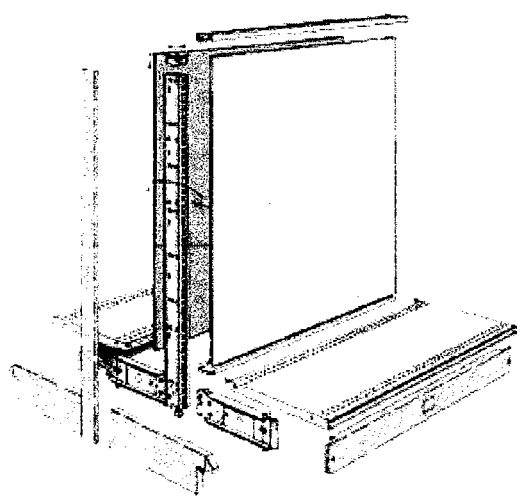
Figure 13C:
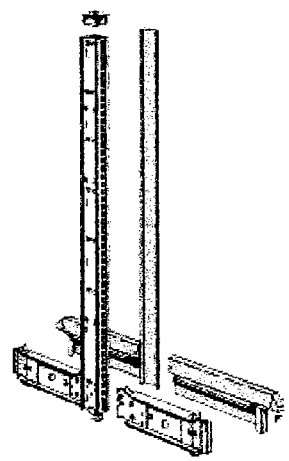

FIG. 5 provides a sketch of an assembled example of pair of support assemblies 1000 of a system for mobilization of stocked gondolas mounted on two different types of manual lift trucks 1400, 1401. One of the trucks 1401 uses a lift mechanism similar to a boat trailer jack. A boat trailer jack uses a hand crank to raise and lower the boat and to give the trailer mobility, in some instances, when the jack has one or more caster wheels. A rack and pinion gear mechanism may be used to translate rotational motion of a hand crank to translational motion of the jack raising and lowering the gondolas, for example. The other truck 1400 uses a hydraulic jack, for example. Any jack with sufficient force to lift the gondolas may be used with a hand truck of the type known in the art to lift and mobilize the gondolas. The hydraulic truck 1400 has an hydraulic jack 1559 mounted between a base and a height adjustable lifting mechanism 1557, which may have one or more grabs 1510 for coupling to a mounting fixture, such as a plate 1593 or slats 1594, 1596. A handle 1553 is provided for positioning and coupling the hydraulic lift 1400 to the support assembly 500. As illustrated in FIG. 5B, a push-pull rod 1580 may be coupled by a hook to an eyebolt 1526 or a U-shaped attachment point 1525 on a truck 1400, 1403, as illustrated in FIGS. 5A and 15A, respectively.

FIG. 6A shows a perspective view of an example of an extendable member 60 that has a channel 61 for mating with a fork-like extension, for example. The member 60 may itself be inserted into a channel 42, 52 of another tube 40, 41. As sketched in the example of FIG. 5A, a support assembly 500 may comprise a pair of opposing support bar assemblies 1000, as illustrated in detailed views of FIGS. 1A-1C, for example. In the detailed views of FIGS. 1A-1C, one end 50 slips telescopically over a first end of an intermediate member 160, and an elongated member 40 slips telescopically over an opposite end of the intermediate member 60. The elongated member 40 in this example has a plurality of holes 63 extending through the thickness of at least one outer wall of the tubular member 40, such that a pin or detent ball or both may be used to couple the elongated member 40 and the intermediate member 160 preventing relative movement of the two members 40, 160 during mobilization of a gondola or a pallet racking. In FIG. 5A, a partial exploded view illustrates the alignment and positioning of two examples of trucks 1400, 1401 with one using a hand crank 145 for raising and lowering the system and the other using a hydraulic jack handle 1555 to raise and lower a hydraulic jack 1559 that raises and lowers the system. One end 41 may be coupled to the other tube 40, 60, 160 by an intermediate member 54, as illustrated in the example of FIG. 11B, for example. Regardless of the type of coupling of one member of a support bar to another, tongues 32, 34 and retainers 70 are aligned between the right-hand and left-hand support bars to provide an interlocking fit, for example.

As illustrated in the drawings of the system, a receiving member 70 is attached to opposing members and are disposed to receive the tongue of the opposing member. A receiving member 70 has a first end 73 and a second end 71 that are attachable to a portion of the system and a body 72 connecting the first end 73 and the second end 71, as illustrated in the views of FIGS. 7A-7C, for example.

FIGS. 8A and 8B illustrate a tongue 82 having a tapered end 84. A tongue 82 and a receiving member may be assembled for a bracket. A receiving member 70, 122 may be used, as illustrated in FIGS. 7A-7C and FIGS. 10A-10C, for example. The bracket 1200 in FIGS. 12A-12C is assembled using the tube 200 of FIGS. 2A and 2B with the receiving member 122 of FIGS. 10A-10C, such as by welding, for use as a slidable, middle bracket for engaging the gondolas at a middle shelf support B. This middle bracket 1200 allows very heavy gondolas and very deep gondolas to be moved without unstocking the shelves, for example. The tongue 82 may be welded to the tube 200 and the receiving member 122, as illustrated in FIGS. 12A-12C, for example. The assembly provides for an interlocking of the tongues 82, 124, 125 of opposing assemblies 1000.

FIGS. 11A and 11B show a portion of a manual truck having forked extensions 10, 20, extending fork-like, that mate with tubes 40, 41. The extensions 10, 20 fit into the channels 42, 52 of their respective tubes 40, 41, as illustrated in FIG. 11B, for example. One of the ends may have a pin 45 inserted through a slot 49 formed in the end of the member 40, and the pin 45 may be disposed such that it engages a recess 25 formed in the end of at least one of the forks 20. When the pin 45 engages the recess 25, the fork 20 is latched in the end of the member 40. Then, when the system is raised, the lifting system, which has wheels, such as caster wheels, may be pulled or pushed to mobilize the gondola and the fork 20 remains latched in the channel formed by the end of the member 40. By lifting the pin 45 free of the recess 25 formed in the at least one fork 20, the fork 20 may be withdrawn from the channel 42, after the gondola is moved and the pair of opposing members are lowered to rest the gondola on the ground, for example. The pin 45 may be retained by a flange, such as a head 47 and/or threaded nuts 43, and/or a cotter pin or the like. Preferably, the pin may be easily raised to release the pin 45 from the recess 25.

FIG. 11B illustrates the interlocking relationship between two tongues 32, 34, at one end of a pair of support members, for example. When the opposing members 40, 41 are aligned on opposite sides of the gondolas supports and are mated, the tongues 32, 34 are retained by the receiving members 70 in the opposing member opposite of the tongues 32, 34.

FIG. 14 illustrates an example of a system for mobilization of stocked gondolas 1 assembled and installed on one end of gondolas 1 having products 3 displayed on the gondolas 1, for example. A tongue 182 from an opposite half of a lift assembly 500 matingly engages a receiving member of the half of the lift assembly 500 shown on an end of the gondolas 1. In a method of moving gondolas 1 a plurality of lift assemblies 500 are positioned along the length of the gondolas 1 such that the entire length of the gondolas 1 may be raised by the lift mechanisms of the trucks 148. When raised, the gondolas 1 may be moved on the caster wheels 149 of the trucks 148 by pulling or pushing the trucks 148, such as by the push-pull handle 1580 illustrated in FIG. 5B, for example. In one example, a hand crank 145 with a rack and pinion gear mechanism 142 is used to raise and lower the fork-like extensions 10, 20 attached to the truck 1401, as illustrated in the example of FIG. 5A, for example. In another example, a hydraulically activated truck 1400 is used to raise and lower fork-like extensions 10, 20 attached to the truck 1400. Either mechanism, or other lift mechanisms, may be capable of raising and lowering gondolas 1, when the lift assembly 500 is aligned on opposite sides of gondola supports A, B, C and is matingly assembled by inserting the tongues 32, 34, 82, 124, 125, 126 into the receiving members 70, 122. In a preferred example, each tongue fits into its respective receiver provider an interlocking fit between each pair of support bar assemblies 500.

If the opposite halves of the support assembly 500 are properly aligned and matingly engaged, then the extensions 10, 20 of the trucks 147, 148 are aligned and engaged in tubular channels 42, 52 in the ends of tubular members 40, 41, 50, as illustrated in FIG. 5, FIG. 11A, FIG. 11B, and FIG. 14, for example. A bracket 120 is capable of being aligned with a middle support B, for example, by slidably engaging a continuous tubular member 40 on each of two opposite halves of the support assembly 500, as illustrated in FIG. 14, for example.

In the example of FIG. 14, the length of the two halves of the support assembly 500 is adjusted using extension member 60 and intermediate member 54 for aligning the ends of the tubular supports 40, 60 having tongues 82 with one outer support A of the gondolas 1 and the tongues 32, 34, 182 of a tubular member 50 with an opposite outer support C of the gondolas 1. The extendable member 60 and intermediate member 54 may telescopically engage to provide for adjusting of the length of the support assembly 500 from one meter to several meters, for example. Since the gondola 1 is fully supported by the middle and outer supports A, B, C, items 3 do not have to be removed from the gondola 1, even for very wide gondolas 1, which otherwise requires labor intensive removal and restocking. Thus, the support assembly 500 provides for a method that saves substantial time and money compared to prior art methods of gondolas mobilization that could not be used to move wide gondolas. In prior art systems, lifts and wheels were only positioned on the outer supports A, C and could not provide support at all of the supports A, B, C. Another system is known that only provides support at a middle support B but not at all of the supports A, B, C.

In the example of FIGS. 15A-15E, views of an example of a preferred lifting mechanism 1403 are illustrated or sketched that comprise a hand crank 1530 (detailed view in FIG. 15C), a screw mechanism contained in a column 1550, such as a rack and pinion gear, for raising and lowering a coupling mechanism 1500 (detailed views in FIGS. 15D and 15E) attached to the column 1550 by one or more pins 1502. A pin 1502 may be biased into a hole 1556 in the column 1550 by a biasing mechanism 1503, adjustably. A pull knob 1501 may be used to release the pin 1502 from the hole 1556, as illustrated in FIGS. 15A and 15B, for example. The coupling mechanism 1500 may include one or more grabs 1510, 1511, which are capable of being mounted in slots on a plate or other mounting device. As illustrated in the example of FIGS. 15D and 15E, the grabs 1510, 1511 are both L-shaped members welded to a flared portion 1509 of the coupling mechanism 1500, for example. A shaft 1507 fits slidably around the column 1550 of the lifting mechanism 1403, for example. In an alternative embodiment, the coupling mechanism 1500 may be fixed to the column 1550 such as by welding.

A base 1560 includes a pair of casters 1558 and a mounting surface for mounting to a bracket 1562 of the column 1550. The coupling mechanism 1500 may include one or more stabilizers 1520 capable of extending to the ground to provide a point of contact to the ground in addition to the casters 1558 for keeping the lifting mechanism 1403 balanced in an upright position, as illustrated in the views of FIGS. 15A and 15E, for example. Alternatively, the coupling mechanism 1500 may include grabs, fasteners or another coupler for coupling directly or indirectly with a gondola. The coupling mechanism, as illustrated in FIGS. 15D and 15E, are provided with L-shaped grabs that are capable of mating with slots formed a gondola structure or in a mounting plate that may be attached to a mechanism for coupling to a gondola or support assemblies, such as the fork extensions 10, 20 of FIG. 11A and as illustrated in FIG. 5A, for example. In FIG. 5A, a plate 1593 and a pair of lateral members 1594, 1596 are shown for mounting the forks 10, 20 to an example of a rack and pinion lift mechanism 1401 or a hydraulic lift mechanism 1400, for example.

A handle 1530, such as illustrated in detail in FIG. 15C may include a rotatable grip 1532 and a ratchet coupling 1535 for removably attaching the handle to a ratchet mechanism in the head of the screw mechanism, such as by the biased detent ball 1537 engaging a groove in the ratchet mechanism 1545. A ratchet mechanism 1545 in the head 1540 attached to column 1550 is surprisingly useful, allowing precise simultaneous raising of a plurality of lift mechanisms by a plurality of users of a plurality of lifting mechanisms, even if one or more of the lifting mechanism are in areas having insufficient room to rotate the handle 1530 by 360 degrees. In addition, an unexpected advantage of having a removably coupled handle 1530 is that storage requirements for a mobilization system are greatly reduced compared to a system with a fixed handle. A U-shaped handle 1525 on the lifting mechanism 1403 provides for coupling to a pull bar (not shown). A pull bar may have a hook on one end of an elongated member for coupling to the U-shaped handle 1525 and may have a handle on the opposite end of the elongated member. The pull bar may be used to pull or push the lifting mechanism 1403 during mobilization of a gondola 1, for example.

Figure 21:
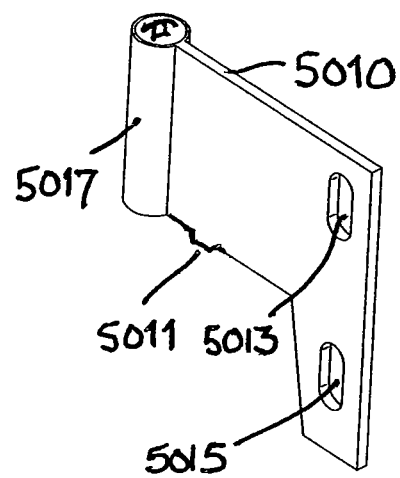
FIG. 21 illustrates a detailed, perspective view of an example of a plate used in an attachment mechanism.
Figure 22:
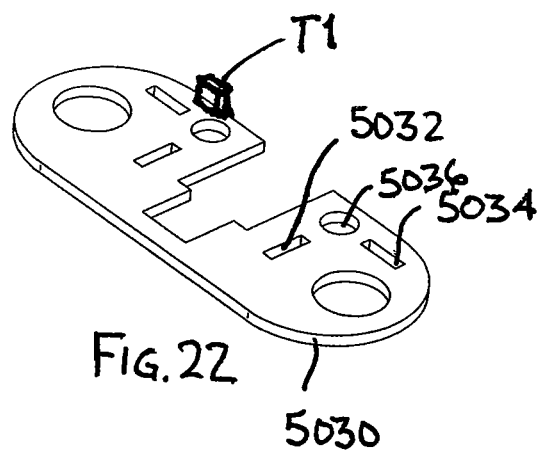
FIG. 22 illustrates a support plate used in a support for an attachment mechanism.
Figure 23:
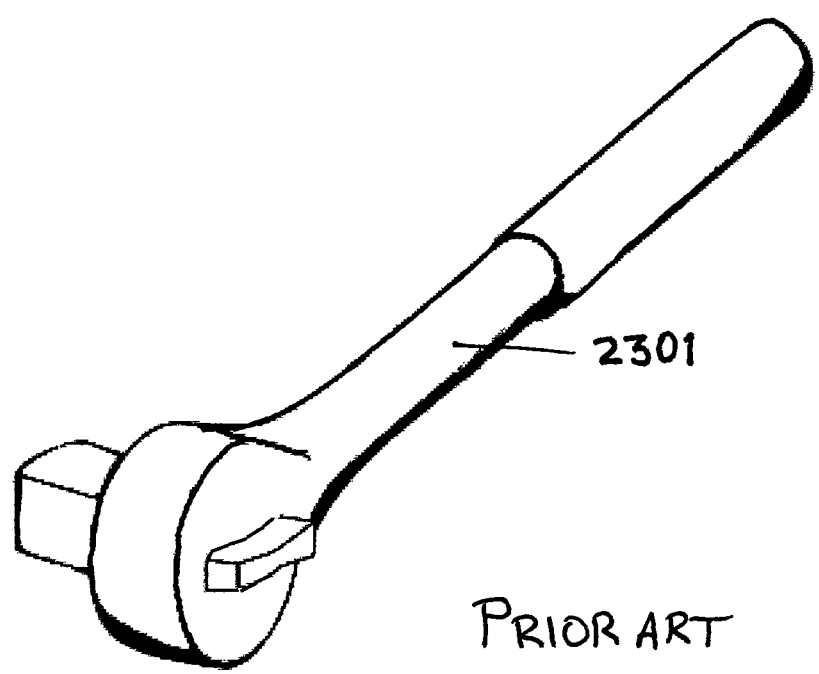
FIG. 23 illustrates a known ratchet wrench.

FIGS. 18A-22 illustrate views of a swing support mobilization lifting device. In this example, a lifting device 5000 is provided for insertion in otherwise inaccessible locations for attachment to support structures of shelving. Holes H in the support structure P of the shelving are aligned with holes, slots, slits or the like in an attachment mechanism 5010, 5040. The attachment mechanism may comprise one or more swing arms 5010, 5040 capable of pivotally rotating about a hinge 5017 coupling the swing arm 5010, 5040 to a jack capable of raising and lowering the swing arm. The jack may be any jack, mechanical, electric, hydraulic or pneumatic; however a mechanical jack, such as used for a boat trailer is preferred for ease of maintenance and small size. The attachment mechanism in the example is comprised of two plates 5010, 5040 (or plate-like members), but may be comprised of a one or more members of any type capable of pivoting out of the way during placement and being pivoted into a support position capable of engaging a portion of the shelving to be supported. In the example of FIG. 21, holes or slots, 5013, 5015 are provided in an end of a plate 5010 opposite of the hinge 5017. A locking tab 5011 may extend from a bottom surface to engagingly fit into slots 5032, 5034 of a support plate 5030, as illustrated in FIG. 22, providing locking of the plate in one of two positions. A spring 5012 may bias the plate downwardly, locking the tab 5011 in a slot 5032, 5034 of the support plate 5030. Thus, the attachment mechanism is displaceable from a stowed position to a support position, for example, by lifting the plate 5010, allowing the lifting device to fit into an otherwise inaccessible location in the stowed position, such as illustrated in FIG. 19A, and to support the shelving when pivoted to the supporting position, such as illustrated in FIG. 19B.

Figure 16B:
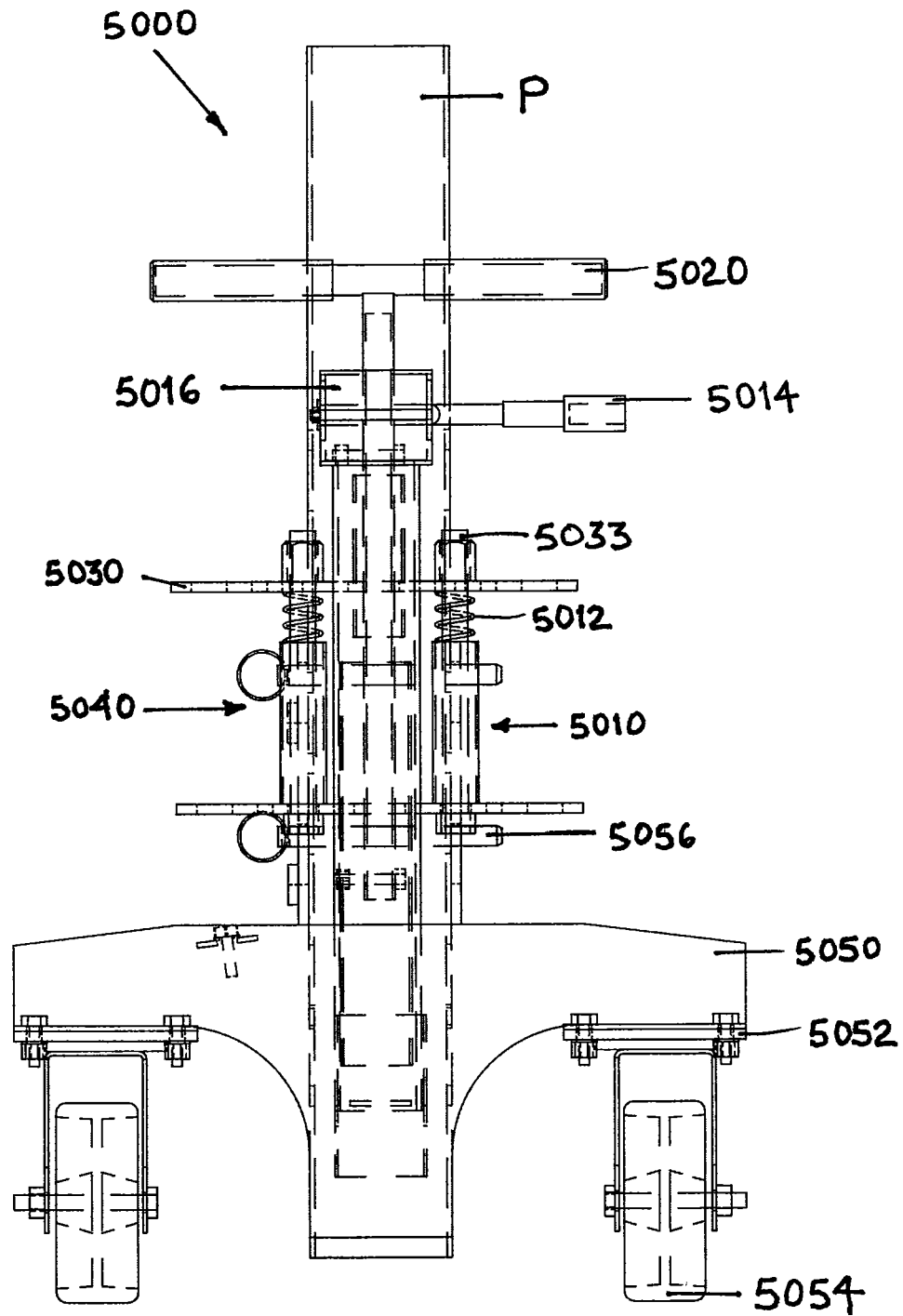
Figure 17B:
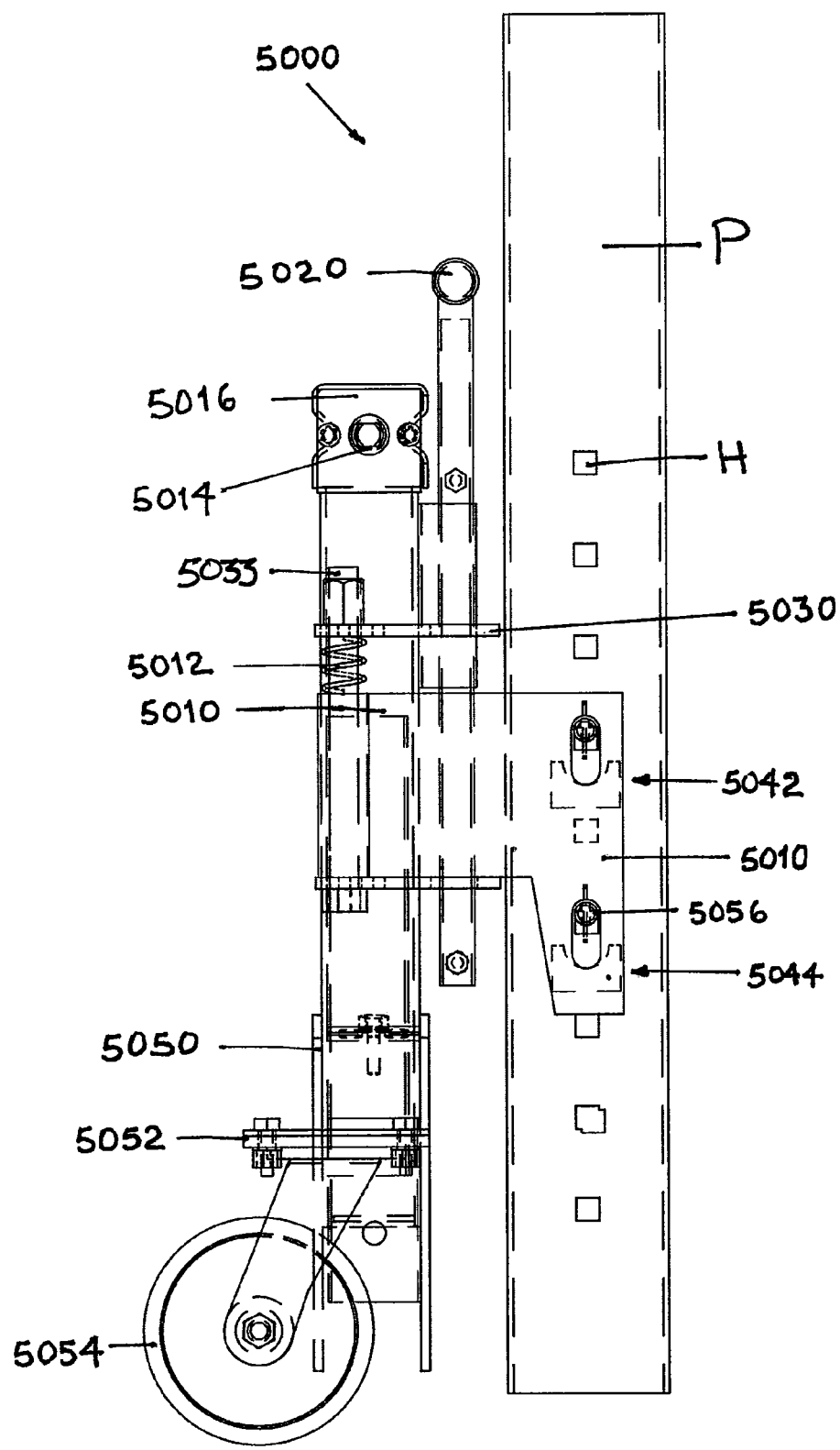
Figure 18B:
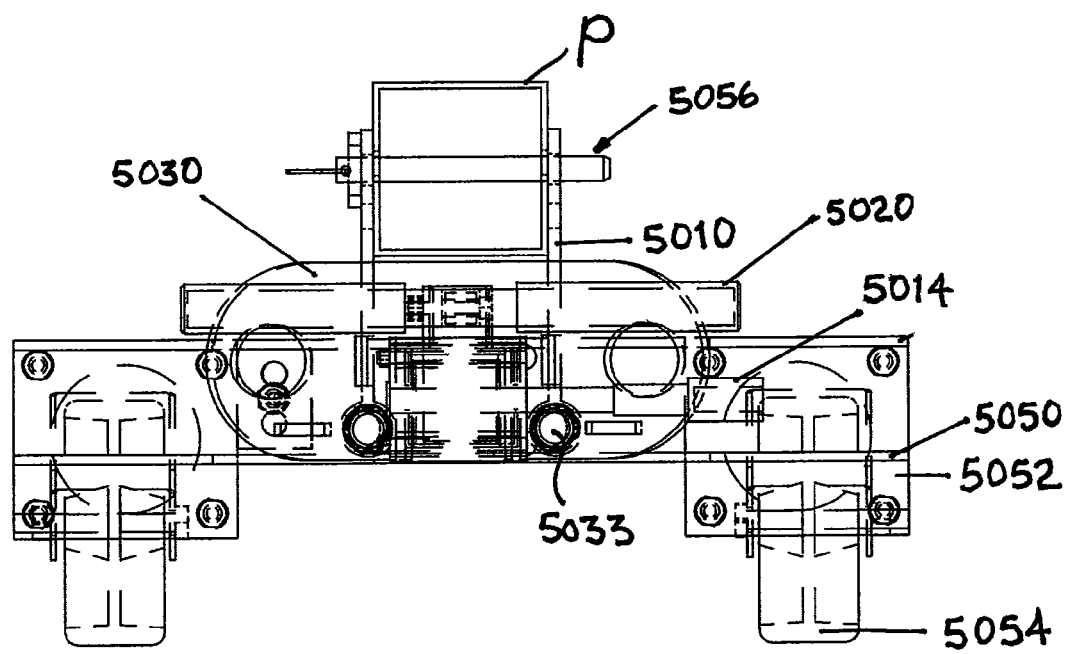
Figure 19B:
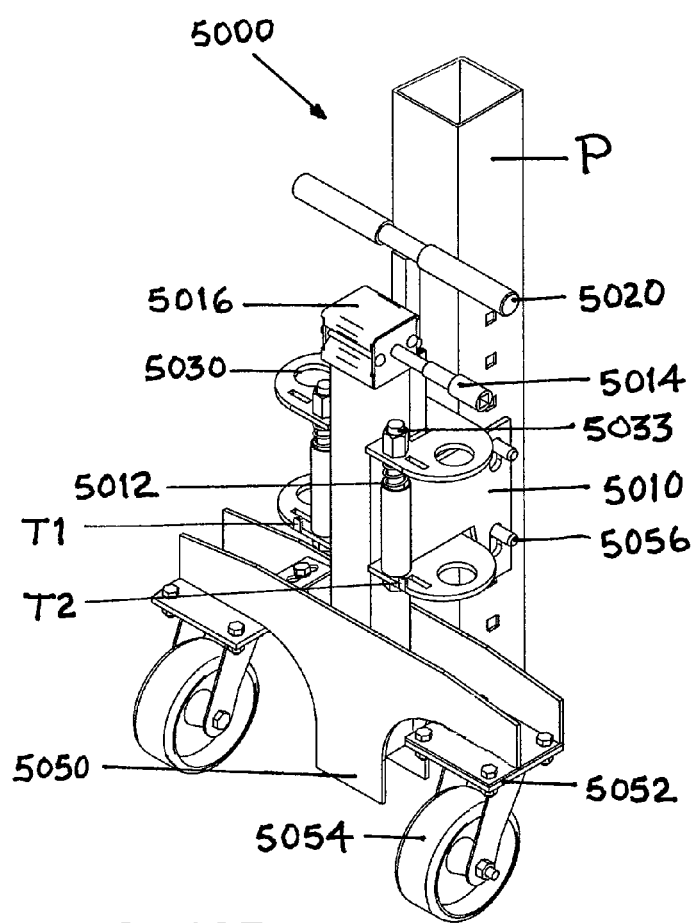

In FIG. 16A, one of pins 5056 is shown in a stowed position, tethered to the lifting device. The pin 5056 is removed from the stowed position prior to inserting the pin through one of the holes in the pair of plates 5040, 5010 comprising the attachment mechanism as illustrated in FIG. 16B. Each of the plates are pivotally connectable as illustrated in FIGS. 17A and 17B, to connect the lifting device 5000 to a support structure 5030. The jack 5016 of the lifting device 5000, raises and lowers the support structure 5030 and the pair of plates 5040, 5010. Each of the pair of plates 5040, 5010 in the example illustrated in FIGS. 16A-19B are biased downwards by a spring 5012, which functions with a detent 5011 or other structure of each plate to keep it in its stowed position until a user raises the plates when pivoting the plates 5010, 5040 into a support position, as illustrated in FIG. 19B, for example. In the example, additional support tabs 5042, 5044 are welded in place on one plate 5040 to increase the area in contact with the each pin 5056.

The support structure 5030 is comprised of a pair of identical plates, for example, mounted to the jack 5016 on opposite sides of the attachment mechanism plates 5040, 5010. A bolt passing through the identical plates of the support structure 5030 provides a hinge for the plates 5040, 5010 of the attachment mechanism. Each of the plates 5040, 5010 includes a sleeve through which the bolt passes, coupling the plates to the support structure 5030. The spring 5012 biases the plates 5040, 5010 downward, keeping a tab on the bottom of the plates engaged with a slot in the plates of the support structure 5030. By applying a force upward on the plates 5040, 5010 of the attachment mechanism, the plates are pivotable to a support position on opposite sides of a shelving support structure, as illustrated in FIG. 19B.

The lifting device includes caster wheels 5054 for mobilization of shelving once the jack 5016 raises the shelving off the floor. A ratchet mechanism 5014 is provided that allows the jack 5016 to be raised and lowered using a socket wrench. A tab 5011 integrally formed on a bottom surface of a plate 5010 in FIG. 21 is capable of engaging each of a plurality of slots 5034, 5032 of a support plate 5030, as illustrated in FIG. 22, when the plate 5010 is in the stowed and support positions, respectively. The plurality of slots may be arranged to position the attachment mechanism in one or more stowed and/or support positions. A hinge bolt extends through the hole 5036 in each of the identical support plates 5030 and the sleeve 5017 of the plate 5010 of the attachment mechanism, pivotally coupling the plate 5010 of the attachment mechanism to the pair of identical support plates 5030, which may be welded to the jack of the lifting device for raising and lowering of stocked shelving.

A handle 5020 is provided on the lifting device 5000 for ease in lifting, holding and positioning the lifting device.

Figure 24:
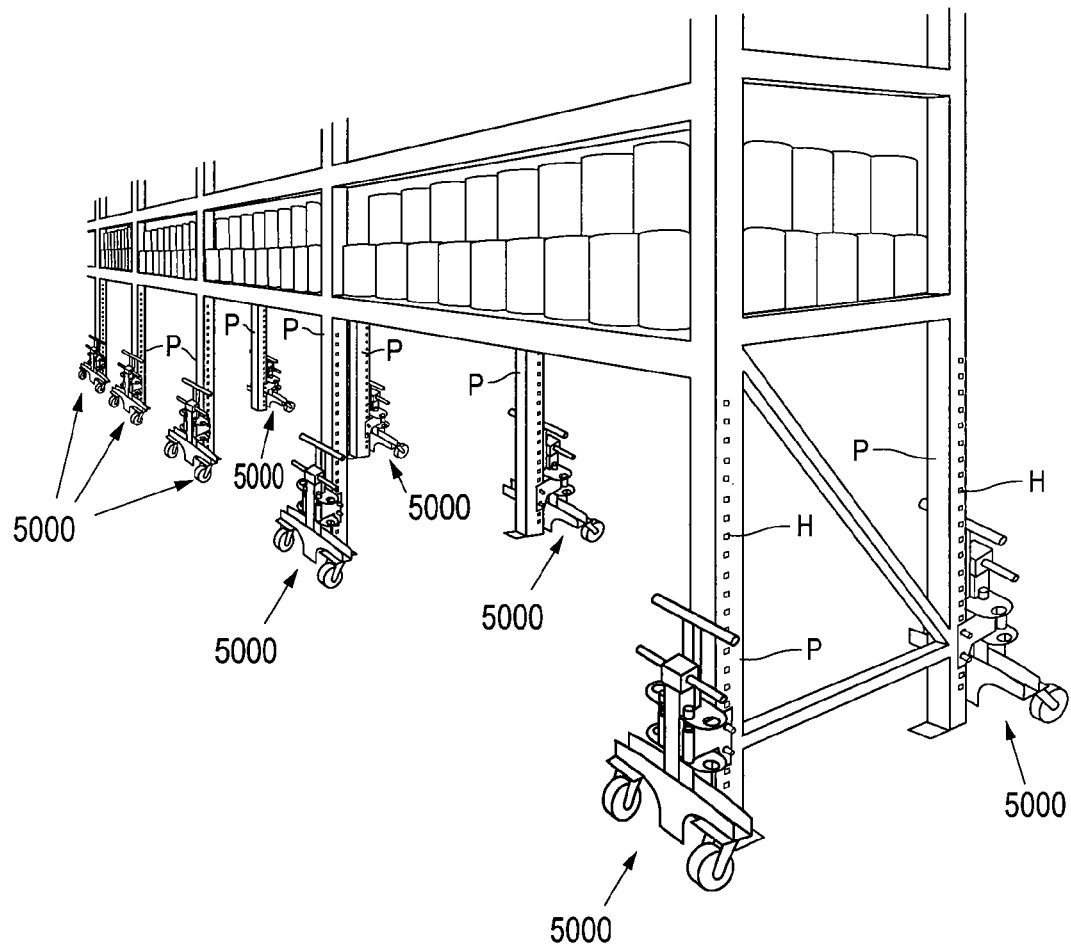
FIG. 24 illustrates a plurality of lifting devices supporting shelving.

Use of the lifting device illustrated in the examples is accomplished by positioning the attachment mechanism tabs in the stowed position, prior to inserting the lifting device in an otherwise inaccessible space. Then, the attachment mechanism plates 5010, 5040 are raised to disengage the tabs 5011, allowing the plates to pivotally rotate about the axis of the hinge bolt 5033 to a support position as illustrated in FIG. 19B. In one example, in FIG. 19, tabs T1, T2 are included to prevent rotation of the plates 5010, 5040 beyond the tabs T1, T2. The holes 5013, 5015 in the plates 5010, 5040 of the attachment mechanism may be aligned by adjusting the height of the jack 5016, and the pins 5056 are inserted through holes H in the shelving supports P and the holes 5013, 5015 of the plates of the attachment mechanism when aligned with those holes, by removing the tethered pins 5056 from their stowed location and inserting the pins 5056 through the aligned holes 5013, 5015, H. The jack 5016 may then be raised using a socket wrench 2301 attached to the ratchet extension 5014. When used to raise a row of shelving, a plurality of lifting devices 5000 are attached to a plurality of shelving supports P. Then, all of the lifting devices are raised to raise the entire row of shelving. In one example, the shelving remains stocked, as illustrated in FIG. 24, during the raising and mobilization of the shelving. The process achieves a very surprising and unexpected rate for the mobilization of shelving compared to any known system of mobilization.

Any jack could be used to raise and lower the shelving; however, a jack 5016 using a rack and pinion gear is surprisingly versatile in tight spaces and provides adequate lifting capability when used as a system having a plurality of lifting devices. For example, a boat trailer type jacket mechanism has the advantage of having an acceptably narrow width while providing for a displacement that positively locks the position of the shelving in its raised position without slipping or lowering or need of a separate locking mechanism. Other combinations and variations of the features in the examples, obvious to those knowledgeable in the art, may be included and are contemplated as being within the scope of the claims that eventually issue.

What is claimed is:

1. A swing support mobilization lift for mobilizing shelving comprises:
   a jack;
   at least one swing arm pivotally coupled to the jack by a hinge, the hinge providing the at least one swing arm with a stowed position and a support position, while remaining pivotally coupled to the jack, such that the jack is capable of raising and lowering the at least one swing arm and the at least one swing arm is capable of pivoting from the stowed position to the support position, the support position extending the swing arm outwardly from the jack and toward the shelving a distance sufficient to couple the swing arm to a portion of the shelving, and wherein, when in the stowed position the at least one swing arm is out of the way such that the at least one swing arm does not extend toward the shelving a distance sufficient to couple the swing arm to the portion of the shelving when in the stowed position; and
   at least one wheel, coupled to the jack, such that when the jack raises the at least one swing arm, the at least one swing arm displaces upwardly with respect to the at least one wheel;
   wherein the at least one swing arm includes two swing arms disposed on opposite sides of the jack; and each of the two swing arms comprises a latching mechanism comprised of a locking tab for latching each of the two swing arms in a stowed position on a support plate; the latching mechanism of each of the two swing arms includes a biasing mechanism, each of the biasing mechanisms applying a force on the biasing mechanism's respective one of the two swing arms, such that the locking tab is retained in the stowed position on the support plate; and each of the latching mechanisms latches its respective swing arm in a support position pivotally displaced from the stowed position, such that each of the two swing arms extends outwardly from the jack and opposed to the other of the two swing arms, such that the locking tab is retained in the support position on the support plate.

2. The lift of claim 1, further comprising at least one elongated pin capable of extending through both a hole through the first of the two swing arms and a hole through the second of the two swing arms, coupling the two swing arms to opposite sides of the portion of the shelving.

3. The lift of claim 1, wherein the at least one wheel includes two caster wheels.

4. The lift of claim 1, wherein the jack includes a rack and pinion gear.

5. The lift of claim 1, where in the jack includes a ratchet extension capable of coupling to a socket wrench.

6. A swing support mobilization system comprising a plurality of the lifts of claim 1.

7. A method for mobilizing shelving using the swing support mobilization system of claim 6, comprising:
- removing a first of the plurality of lifts from a shipping container;
- positioning the first of the plurality of lifts adjacent to the portion of the shelving;
- pivotally rotating the at least one swing arm of the first of the plurality of lifts from the stowed position to the support position and latching the locking tab, such that the locking tab is retained in the support position on the support plate;
- coupling the at least one swing arm of the first of the plurality of lifts to the portion of the shelving;
- raising the jack of the first of the plurality of lifts;
- repeating the steps of the process for the first of the plurality of lifts for each of the plurality of lifts until the shelving is raised from contacting the floor; and
- displacing the shelving from its initial location to a location at a distance from its initial location.

8. The method of claim 7, wherein the step of displacing moves the shelving without unstocking the shelving.

9. The method of claim 7, wherein the step of positioning includes positioning at least a portion of the plurality of lifts between shelving positioned back-to-back with other shelving.

* * * * *